US008112888B2

(12) United States Patent
Jensen (10) Patent No.: US 8,112,888 B2
(45) Date of Patent: Feb. 14, 2012

(54) METHOD FOR REPAIRING RISER PIPE ELBOW WELD IN BOILING WATER NUCLEAR REACTOR

(75) Inventor: Grant Clark Jensen, Morgan Hill, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1253 days.

(21) Appl. No.: 11/768,409

(22) Filed: Jun. 26, 2007

(65) Prior Publication Data

US 2009/0001229 A1    Jan. 1, 2009

(51) Int. Cl.
*B21D 53/02* (2006.01)
*B23P 6/00* (2006.01)
*G21C 19/28* (2006.01)

(52) U.S. Cl. ............... 29/890.03; 29/525.01; 29/402.09; 29/402.14; 376/372; 376/260

(58) Field of Classification Search ............... 29/890.03, 29/525.01, 723, 402.09, 402.14; 376/370, 376/372, 461, 289, 260; 285/53; 248/74.1, 248/245
See application file for complete search history.

(56) References Cited

U.S. PATENT DOCUMENTS

| | | | |
|---|---|---|---|
| 3,550,638 A | 12/1970 | Smith | |
| 4,776,618 A * | 10/1988 | Barree | ............ 285/341 |
| 4,927,181 A | 5/1990 | Ciotola | |
| 5,785,361 A | 7/1998 | Bourbour et al. | |
| 5,876,146 A | 3/1999 | Deaver et al. | |
| 6,108,391 A | 8/2000 | Deaver et al. | |
| 6,236,700 B1 | 5/2001 | Erbes et al. | |
| 6,264,203 B1 * | 7/2001 | Weems et al. | ........... 277/314 |
| 6,375,230 B1 | 4/2002 | Jensen et al. | |
| 6,421,406 B1 * | 7/2002 | Jensen | ............ 376/352 |
| 6,481,757 B1 * | 11/2002 | Pao et al. | ............ 285/125.1 |

* cited by examiner

*Primary Examiner* — Sarang Afzali
(74) *Attorney, Agent, or Firm* — Nixon & Vanderhye P.C.

(57) ABSTRACT

A support clamp assembly for mechanically securing a thermal sleeve to an elbow conduit in a jet pump of a nuclear reactor vessel, the support clamp assembly including: a tension shaft having a first end extendable through an opening in a sidewall of the elbow conduit and an opposite end with a head; a cruciform assembly having a base with an opening to receive the tension shaft and to abut the head of the shaft, wherein the cruciform assembly seats in the thermal sleeve; a boss slidable over the first end of the tension shaft and having a curved surface seating an outside surface of the elbow conduit, and a coupling device engaging the first end of the tension shaft and abutting the boss, wherein the coupling device places the tension shaft under tension to secure the cruciform assembly to the thermal sleeve and the boss to the elbow conduit.

4 Claims, 8 Drawing Sheets

METHOD FOR REPAIRING RISER PIPE ELBOW WELD IN BOILING WATER NUCLEAR REACTOR

BACKGROUND OF INVENTION

The present invention relates to an apparatus and method for supporting or repairing a welded joint between a thermal sleeve and an elbow of a jet pump in a water recirculation system of a boiling water nuclear reactor (BWR).

In a boiling water nuclear reactor, an annular space is defined between the core shroud and the reactor pressure vessel wall. Jet pumps are located in the annular space for recirculating water in the reactor. Each jet pump typically includes a riser conduit, connected to an elbow conduit in the annular space. The elbow conduit is welded to a thermal sleeve which penetrates the reactor pressure vessel wall and supplies water for recirculation through the reactor via a jet pump. The weld between the thermal sleeve and the elbow conduit is typically a full penetration butt weld. The weld joint lies within the confined space of the annulus. Access to the weld joint is highly restricted. Moreover, the weld joint is subjected to the reactor environment and is subject to intergranular stress corrosion cracking.

The jet pump assemblies in the reactor vessel can flood the core to about two-thirds the core height in the event of a Loss of Coolant Accident (LOCA). If the integrity of the jet pump recirculation piping becomes compromised, such as due to a piping break or separation of the riser pipe elbow conduit from the inlet nozzle thermal sleeve, the jet pump system may lose its ability to flood the core during a LOCA.

Over time, cracks may occur in the weld joint between the thermal sleeve and the elbow conduit. Propagation of cracks in the weld joint can compromise the integrity of the weld joint between the elbow and thermal sleeve. Some leakage flow through a cracked welded joint may be tolerable because water leakage does not degrade the ability of the jet pumps to flood the core. However, propagation of cracks in the weld joint may lead to separation of the thermal sleeve and elbow conduit to the jet pump. Upon separation of the sleeve and elbow, the jet pump recirculation system may be severely degraded due to reduction in coolant flow.

Replacement or repair of the weld joint between the thermal sleeve and the elbow conduit might be accomplished by breaching the piping system external to the reactor in a dry-well area of the containment system. This approach would necessitate off-loading the fuel from the reactor and draining the reactor vessel water level down to a level below the recirculation inlet nozzles. The associated thermal sleeve and piping safe-end could then be replaced to restore structural integrity of the recirculation piping system. Such an approach would be costly. Accordingly, there is a long felt need for a method and device to provide weld replacement or repair the weld joint between the thermal sleeve and the elbow.

SUMMARY OF INVENTION

A support clamp assembly is disclosed for mechanically securing a thermal sleeve to an elbow conduit in a jet pump of a nuclear reactor vessel, the support clamp assembly including: a tension shaft having a first end extendable through an opening in a sidewall of the elbow conduit and an opposite end with a head; a cruciform assembly having a base with an opening to receive the tension shaft and to abut the head of the shaft, wherein the cruciform assembly seats in the thermal sleeve; a boss slidable over the first end of the tension shaft and having a curved surface seating an outside surface of the elbow conduit, and a coupling device engaging the first end of the tension shaft and abutting the boss, wherein the coupling device places the tension shaft under tension to secure the cruciform assembly to the thermal sleeve and the boss to the elbow conduit.

A support clamp assembly is disclosed for mechanically securing a thermal sleeve to an elbow conduit in a jet pump of a nuclear reactor vessel, the support clamp assembly comprising: a tension shaft having a threaded end extendable through an opening in a sidewall of the elbow conduit and a head at an opposite end of the shaft; a cruciform assembly having a base with an opening to receive the tension shaft, wherein the base includes an end surface shaped to receive the head of the shaft, wherein the cruciform assembly seats in the thermal sleeve; a boss having an opening through which extends the threaded end of the tension shaft, the boss includes a first end with a curved surface to seat on an outside surface of the elbow conduit and an opposite end with a recess to receive a nut, and the nut screws onto the threaded end of the tension shaft, wherein the nut places the tension shaft under tension to secure the cruciform assembly to the thermal sleeve and the boss to the elbow conduit.

A method is disclosed to assemble a support clamp assembly in a jet pump of a nuclear reactor vessel, the method comprising: attaching a cable to a first end of a shaft and lowering the bolt and cable into an elbow conduit and thermal sleeve of the jet pump; guiding at least one thermal sleeve anchor device down the cable to slide the anchor device on the shaft, wherein the anchor device abuts against a second end of the shaft; seating the anchor device against an inside surface of the thermal sleeve; pulling the cable through the hole in the elbow; extending the cable and shaft from the anchor device, through an aperture in the elbow conduit; attaching a securing device to the first end of the shaft extending through the aperture in the elbow conduit, wherein the securing device is against an outside surface of the elbow conduit, and applying tension to the shaft which biases the thermal sleeve to the elbow conduit.

DETAILED DESCRIPTION OF INVENTION

An apparatus and method has been developed to support or repair a weld in an inlet nozzle thermal sleeve to riser pipe elbow conduit for a recirculation jet pump system in a boiling water nuclear reactor. A mechanical support clamp assembly has been developed to provide structural support to the welds that join the thermal sleeve to the elbow conduit leading to the riser pipe in a jet pump. The support clamp assembly maintains the spatial relationship of the jet pump riser pipe and recirculation inlet nozzle thermal sleeve. The support clamp assembly supports the welds by adsorbing some of the forces on the joints between the jet pump riser pipe and recirculation inlet nozzle thermal sleeve, and by ensuring that the elbow conduit of the riser pipe and thermal sleeve do not separate in the unlikely event of a weld failure. By maintaining the spatial relationship with the support clamp assembly, the positional relationship between the recirculation inlet nozzle thermal sleeve and the riser pipe elbow conduit is preserved during normal operation and in the unlikely event of a Loss of Coolant Accident (LOCA).

Figure 1:
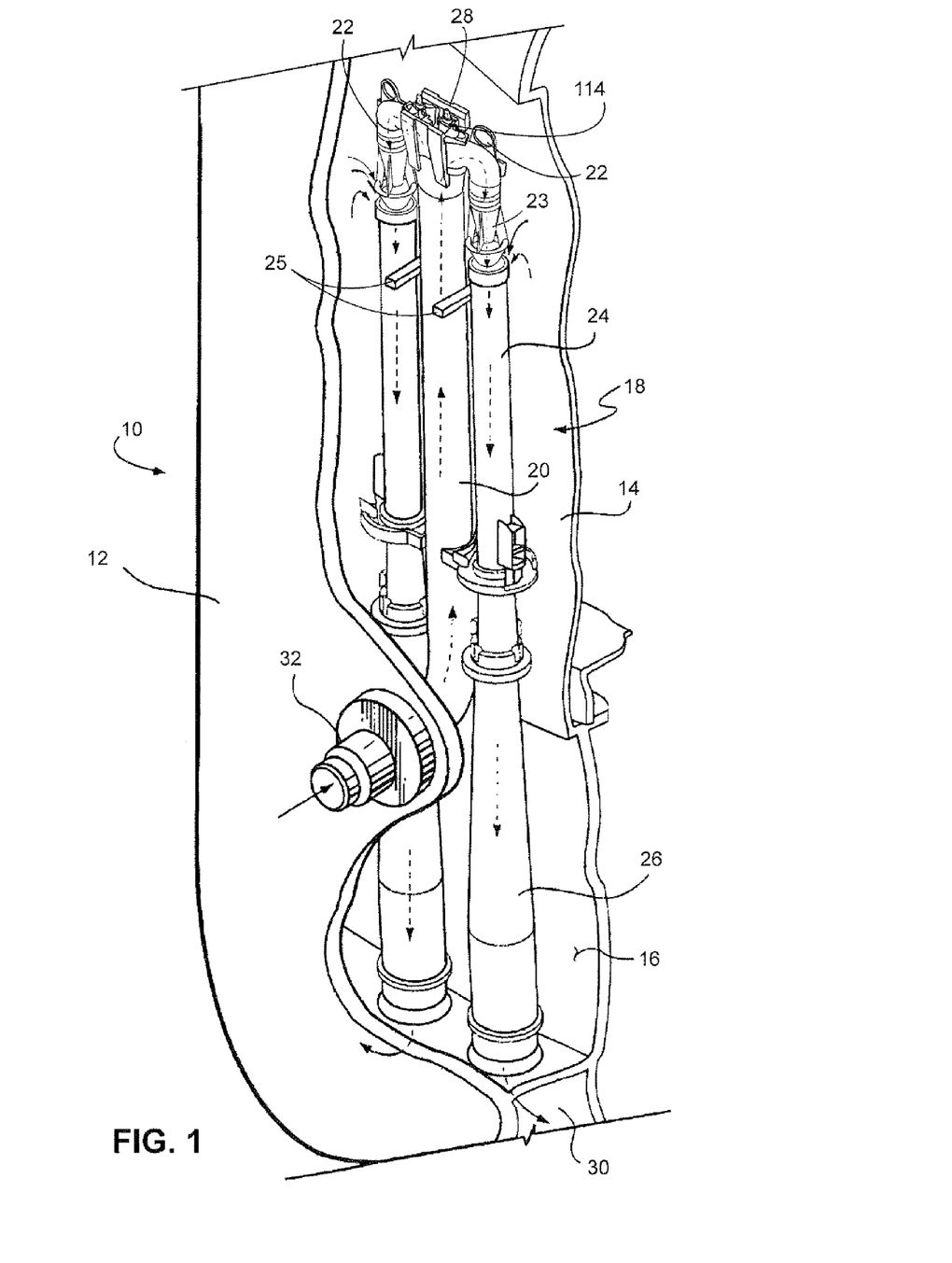
FIG. 1 is a perspective view of a portion of a boiling water reactor with the vessel wall and shroud (core wall) a cut away to show in the gap therebetween exemplary jet pumps connected to a thermal sleeve at the vessel wall.

FIG. 1 shows a reactor pressure vessel 10 having a reactor pressure vessel wall 12 and an inner core shroud 14 separated by a generally annular space 16. Several jet pumps, one being generally designated 18, are disposed in the annular space and in an annular array around the core shroud 14. Each jet pump 18 typically comprises an inlet riser pipe 20, a pair of inlet elbows 22 adjacent the upper end of the inlet riser, a pair of nozzles 23, a pair of mixing assemblies 24, and a pair of diffusers 26. A riser pipe transition 28 splits the flow and redirects the flow through the elbows 22 and nozzles 23 and down to the mixing section. The riser pipe transition is at the top of the jet pump 18. The riser pipe transition 28 is supported by braces 25 attached to the vessel wall 12. In addition, braces and restrainers maintain the jet pump 18 in a fixed position in the annular space 16 between the core shroud 14 and pressure vessel wall 12.

The jet pump receives external water under pressure through a thermal sleeve 32 that penetrates and is seated in the pressure vessel wall 12. The thermal sleeve is welded to an inlet elbow conduit 34 (see FIG. 2). The opposite end of the inlet elbow 34 is secured to the lower end of the inlet riser 20. Water enters the thermal sleeve 32 and flows through the elbow 34, upwardly in the inlet riser 20, through the inlet elbows 22 into the jet pump nozzles 23 for flow in a downward direction through the mixing assembly 24, the diffusers 26 and into a plenum 30 for upward flow through the reactor core. The jet pump nozzles 23 induce water to flow from the annular space 16 to the mixing assemblies 24 where the water from the annular space 16 mixes with the water passing through the jet pump nozzles.

Figure 2:
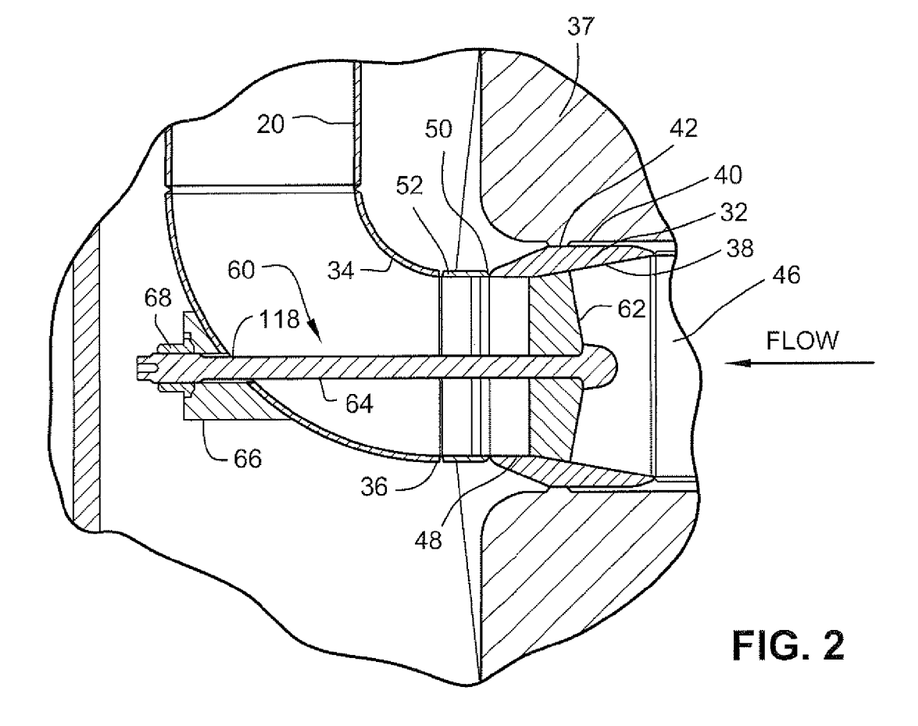
FIG. 2 is an enlarged cross-sectional view of the riser pipe and elbow conduit welded to a thermal sleeve in the vessel wall, and showing a clamp assembly supporting the weld joint between the elbow conduit and thermal sleeve.
Figure 3:
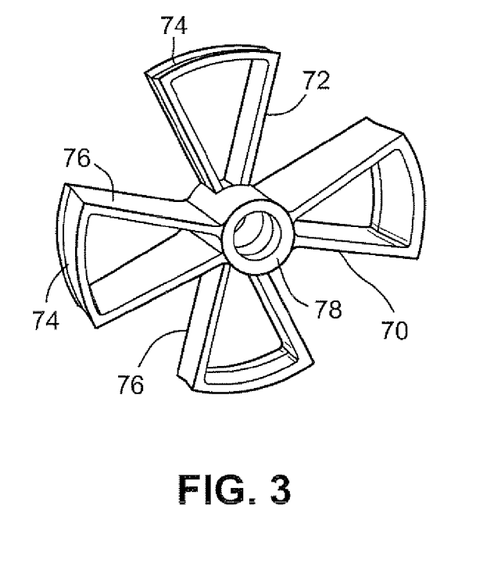
FIGS. 3 and 4 are perspective front and rear views, respectively, of a cruciform assembly for the clamp assembly.
Figure 4:
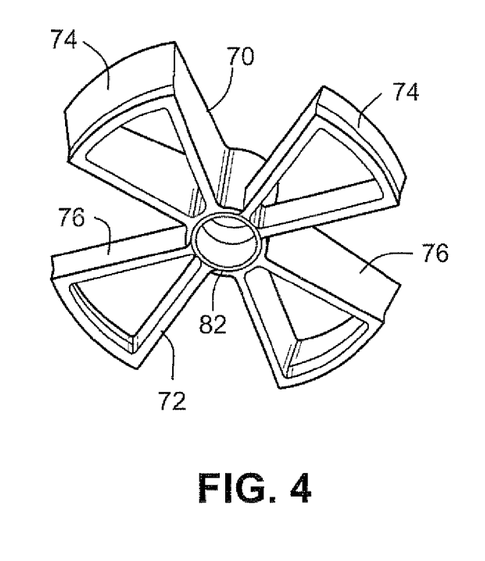

FIG. 2 is a cross-sectional view of the riser pipe 20 and elbow conduit 34 that is welded (see RS-1 weld joint 36) to the thermal sleeve 32, interfaces with the wall 37 of the reactor vessel at pads 42. The thermal sleeve 32 includes a generally converging conical segment 38 seated in a nozzle 40 which is an opening in the wall 37.

The conical segment 38 of the thermal sleeve may be fabricated from inconel. The inside surface of the segment 38 includes a conical section that has a large diameter inlet facing an inlet tube 46 of the thermal sleeve and a narrow diameter towards an inner end 48 of the segment 38. The inner end 48 of thermal sleeve conical segment 38 is welded 50, e.g., a bimetallic weld designated a RS-1A weld, to a cylindrical coupling 52 fabricated from stainless steel. The opposite end of the cylindrical coupling 52 is welded 36, e.g., weld RS-1, to the inlet elbow 34.

A support clamp assembly 60 mechanically couples the thermal sleeve 32 to the inlet elbow conduit 34. The support clamp includes a cruciform assembly 62, a draw bolt 64, a boss 66, a latch spring seated in the boss, and a nut 68. The cruciform assembly 62 seats on the conical inside surface of the conical segment 38 of the thermal sleeve 32. The cruciform assembly anchors the support clamp assembly to the thermal sleeve. A draw bolt extends through the cruciform and has a bolt head that seats on the cruciform.

The opposite end of the bolt 64 extends through a wall of the elbow conduit and engages the boss 66 seated on the wall of the elbow conduit. The threaded nut 68 screws on the threaded end of the draw bolt. The nut abuts against the boss. The nut is turned on to the threaded end of bolt to place the bolt shaft under tension. The tension on the bolt applies a force to the cruciform assembly and the thermal sleeve 32 in a direction of the bolt shaft and the elbow conduit 34. Similarly, the tension on the bolt pulls the boss and elbow conduit towards the thermal sleeve. Due to the tension of the bolt shaft, the support clamp assembly 60 secures the thermal sleeve 32 to the elbow conduit 34.

FIGS. 3 to 6 show the cruciform assembly which includes a primary cruciform 70 and a secondary cruciform 72. The primary and secondary cruciform components may be fabricated from inconel, which is preferably the same material as the conical segment 38 of the thermal sleeve. By forming the cruciform assembly and thermal sleeve conical segment of the same material, they have similar thermal expansion characteristics. The primary and secondary cruciforms when assembled form a brace having outer surfaces 74 that abut the inner surface of the conical segment 38. The outer surfaces 74 of the cruciform assembly seat against the inner surface of the conical segment to brace the clamp assembly against the thermal sleeve.

The cruciforms have an open construction to allow substantially uninterrupted flow of coolant water through the thermal sleeve. Ribs 76 in the cruciforms 70, 72 span between the outer surfaces 74 and their center bases 78, 82. The ribs are aligned with the flow direction through the thermal sleeve such that the ribs are narrow in the flow direction. Water flows across the ribs without much resistance or disturbance to the flow of the water. The primary cruciform 70 includes a center cylindrical base 78 having a slot 80 to receive the base 82 of the secondary cruciform and a spherical concave seat 84 to receive the head of the draw bolt.

Figure 5:
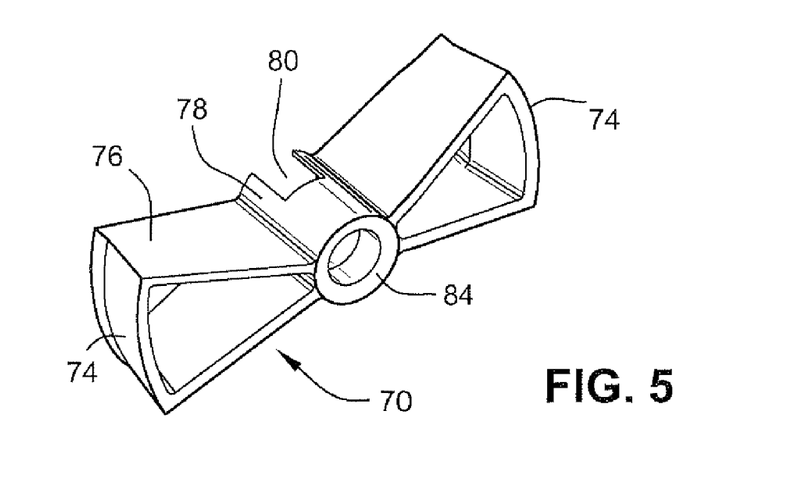
FIG. 5 is perspective view of a primary cruciform of the cruciform assembly.
Figure 6:
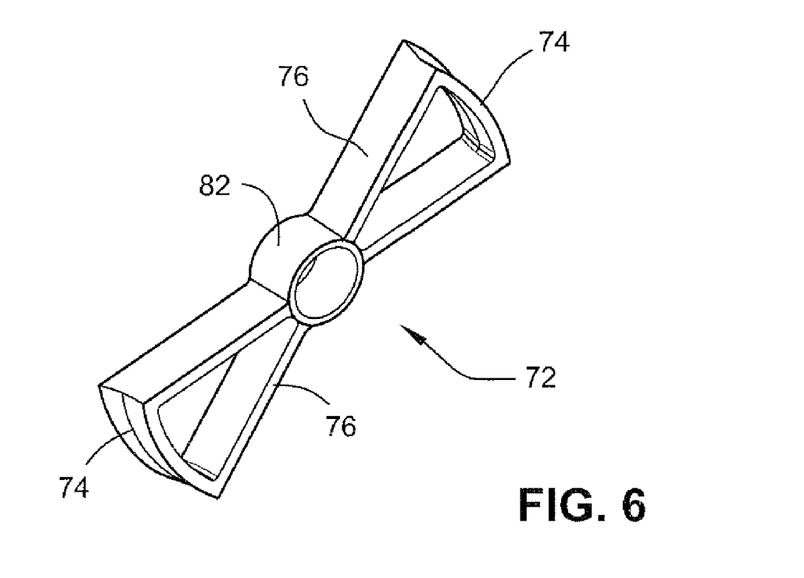
FIG. 6 is perspective view of a secondary cruciform of the cruciform assembly.

The seat 84 on the base 78 of the primary cruciform 70 allows the bolt head to pivot a few degrees and thereby adjust if the cruciforms are not entirely perpendicular to the bolt shaft. A spherical ledge surface 88 of the draw bolt when mated with the spherical seat 84 of the primary cruciform allows limited articulation of the draw bolt relative to the cruciform assembly, thus precluding the imposition of any bending loads on the draw bolt.

The slot 80 in the base 78 of the primary cruciform receives and supports the secondary cruciform and allows the secondary cruciform to shift slightly angularly when the outer surfaces 74 of the cruciforms seat against the inside walls of the conical segment of the thermal sleeve.

Figures 7, 8:
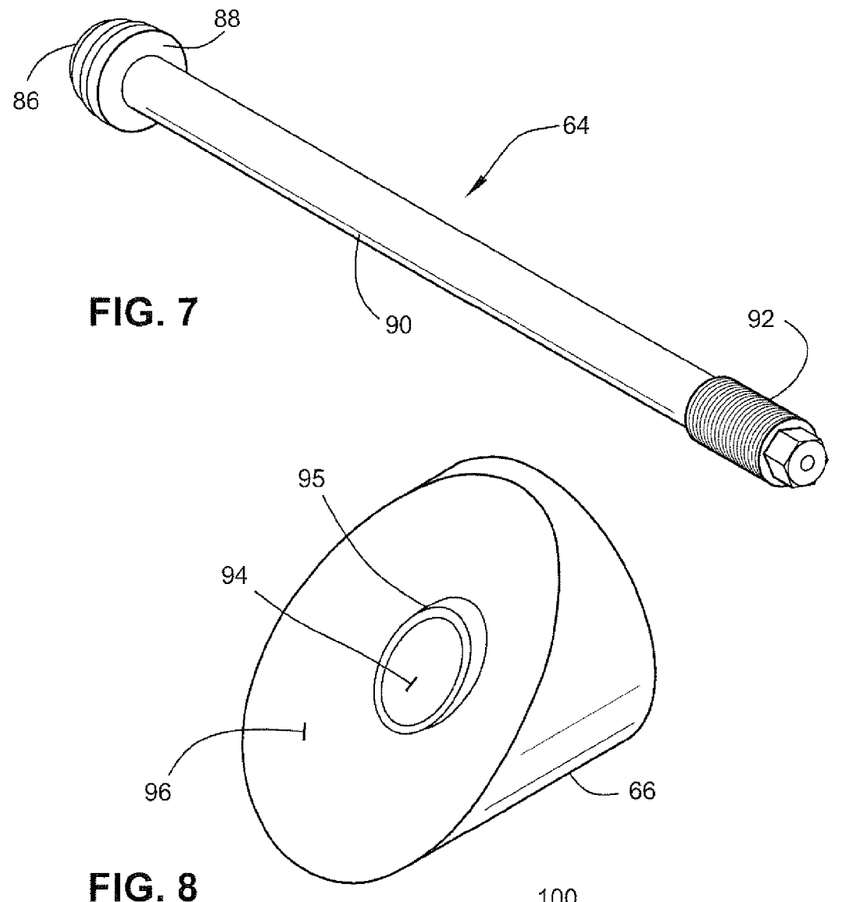
FIG. 7 is a perspective view of a draw bolt for the cruciform assembly, where one end of the bolt is supported by the cruciform assembly.
FIGS. 8 and 9 are perspective front and rear views, respectively, of an elbow boss for securing an opposite end of the draw bolt to the elbow conduit.

FIG. 7 is a perspective view of the draw bolt 64. The bolt head 86 includes a convex spherical surface on a lower ledge 88 that seats in the concave spherical seat of the base of the primary cruciform. The bolt shaft 90 has a length sufficient to extend from the boss, through the elbow conduit and to the cruciform assembly in the thermal sleeve. The proximal end 92 of the bolt is threaded. Upon installation, the proximal end extends through apertures in the elbow conduit and boss, and engages the nut on the exposed side of the boss. The draw bolt may be formed from austenitic stainless steel type XM-19.

Figure 9:
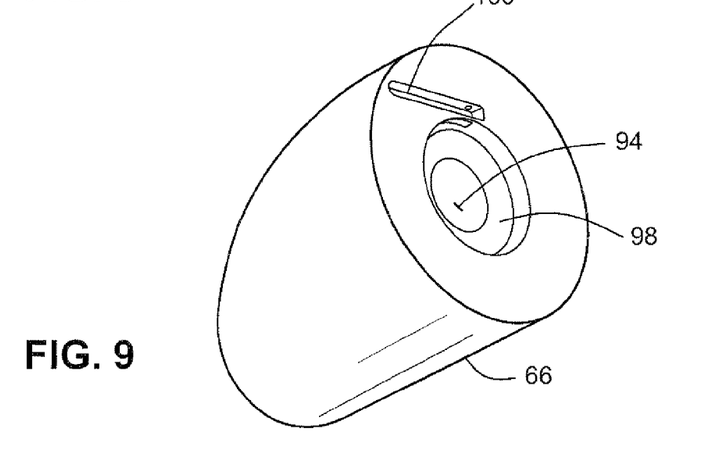

FIGS. 8 and 9 are perspective views of the front and rear, respectively, of the elbow boss 66. The boss may be fabricated from austenitic stainless steel, type 316, and machined to conform to an outside surface of the elbow conduit. The elbow boss 66 is held in position relative to the elbow by a sleeve 94 extending through the boss. The sleeve 94 is inserted into a cylindrical opening extending through the elbow. A short end stub 95 of the sleeve protrudes from a surface 96 of the boss which abuts the elbow conduit. The abutting surface 96 of the boss is curved to match the outer surface of the elbow conduit in contact with the boss. The stub 95 protrusion of the sleeve slides into an aperture in the elbow conduit. The stub aligns the boss to the elbow conduit and keys the elbow boss to the elbow. The opening in the short radius turn of the elbow conduit is a circular hole that may be machined by electric discharge machining (EDM). The stub of the sleeve and the curved surface 96 of the boss forms a seal for the opening of the elbow conduit. The sleeve also provides a conduit through which extends the draw bolt as the bolt protrudes out of the elbow.

A spherical annular seat 98 is recessed in the circular end of the boss which is opposite to the surface 96 for the elbow conduit. The seat 98 mates with a corresponding spherical surface 108 of the nut 68. A machined cavity 100 in the boss is adjacent the seat 98 and receives a latch spring 102 (FIGS. 12 and 13).

Figure 10:
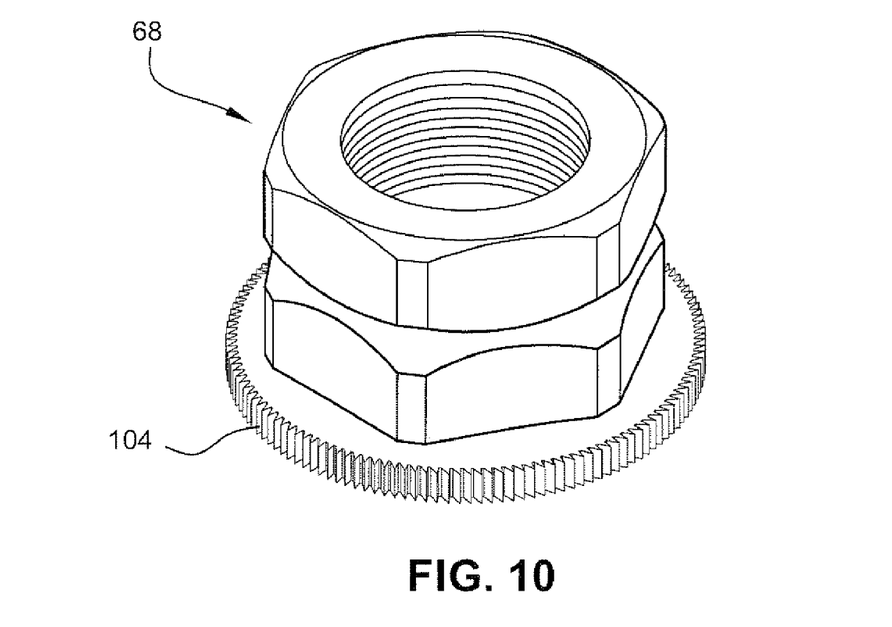
FIGS. 10 and 11 are perspective front-side and rear-side views, respectively, of a nut secured against the elbow boss.
Figure 11:
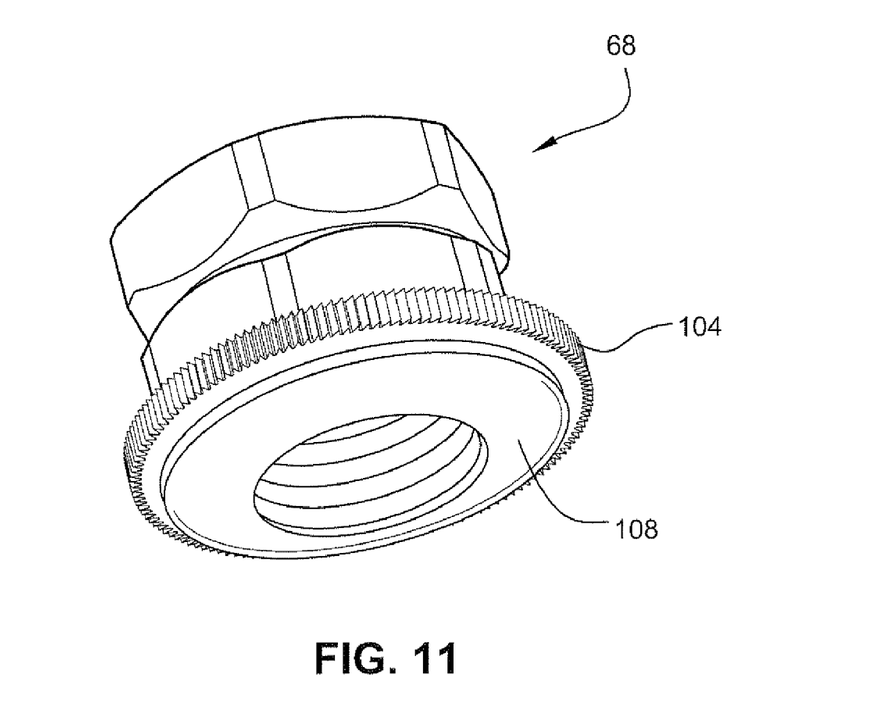

FIGS. 10 and 11 are perspective views of the nut 68 that screws on the threaded end of the draw bolt. The nut includes an internal cylindrical aperture with threaded sidewalls and outside sidewalls extended to engage a wrench or other device to tighten the nut on the threaded end of the bolt. A flange 104 of the nut includes an outer circular edge having teeth to engage a pawl 106 (FIG. 13) of the latch spring to prevent unintended rotational movement of the nut when seated in the seat 98 of the boss. The engagement of the pawl and teeth prevent loosening of the mechanical joint, when subjected to flow induced vibration. The spherical annular bottom surface 108 of the nut seats on the seat 98 of the boss to allow limited articulation of the nut and draw bolt relative to the boss.

Figure 12:
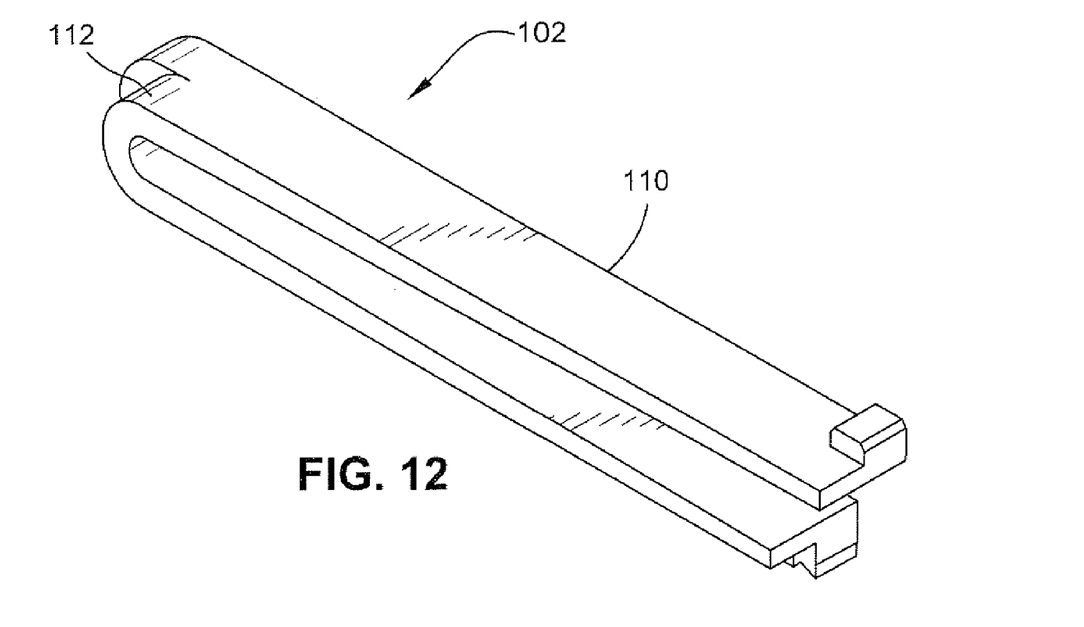
FIGS. 12 and 13 are perspective front-side and rear-side views, respectively, of a latch spring for the elbow boss of the cruciform assembly.
Figure 13:
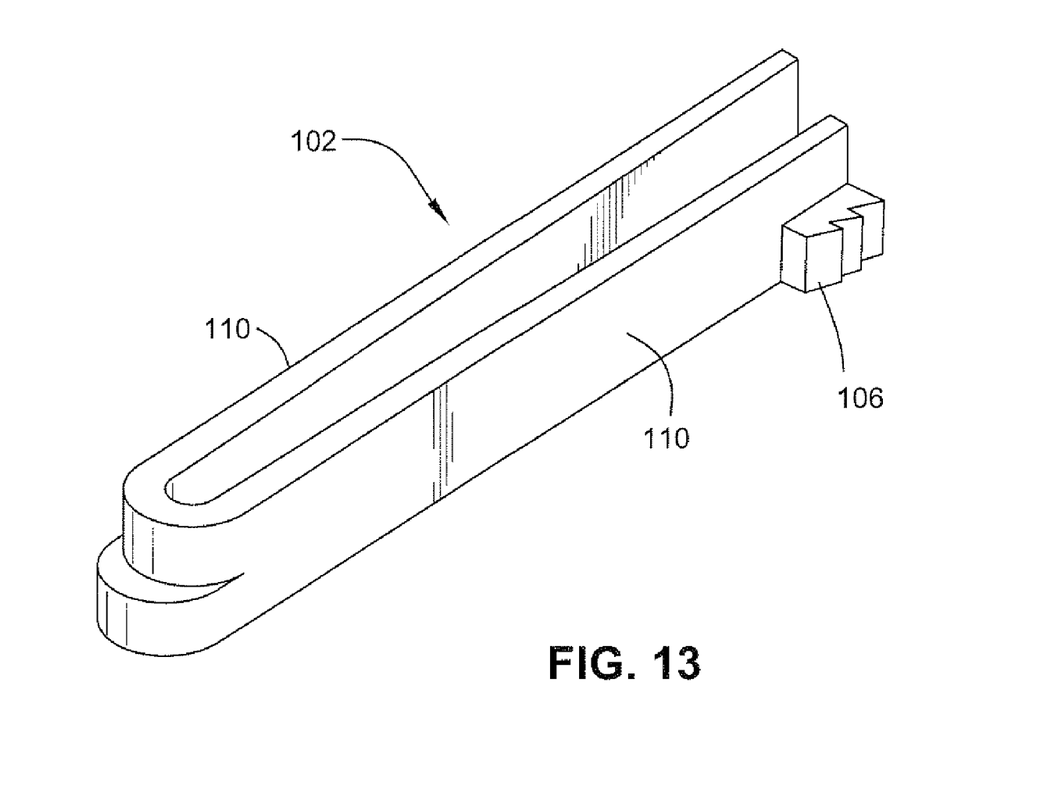

FIGS. 12 and 13 are perspective views of the sides of the latch spring 102. The latch spring is generally shaped as a hairpin with a pair of extended legs 110 and a connecting corner end 112 having a rim engaging an overhanging lip in the back corner of the cavity 100 (FIG. 9) of the boss, which is generally shaped to receive the latch spring. The latch spring is held in the cavity 100 by overhangs in the cavity that extend partially over the corner end 112 and legs 110. To insert the latch spring into the cavity, the legs are pinched together as the spring is slid into the cavity. The latch spring provides a bias on the prawl 106 that engages the teeth 104 of the nut and thereby prevents loosening rotation of the nut.

Figure 14:
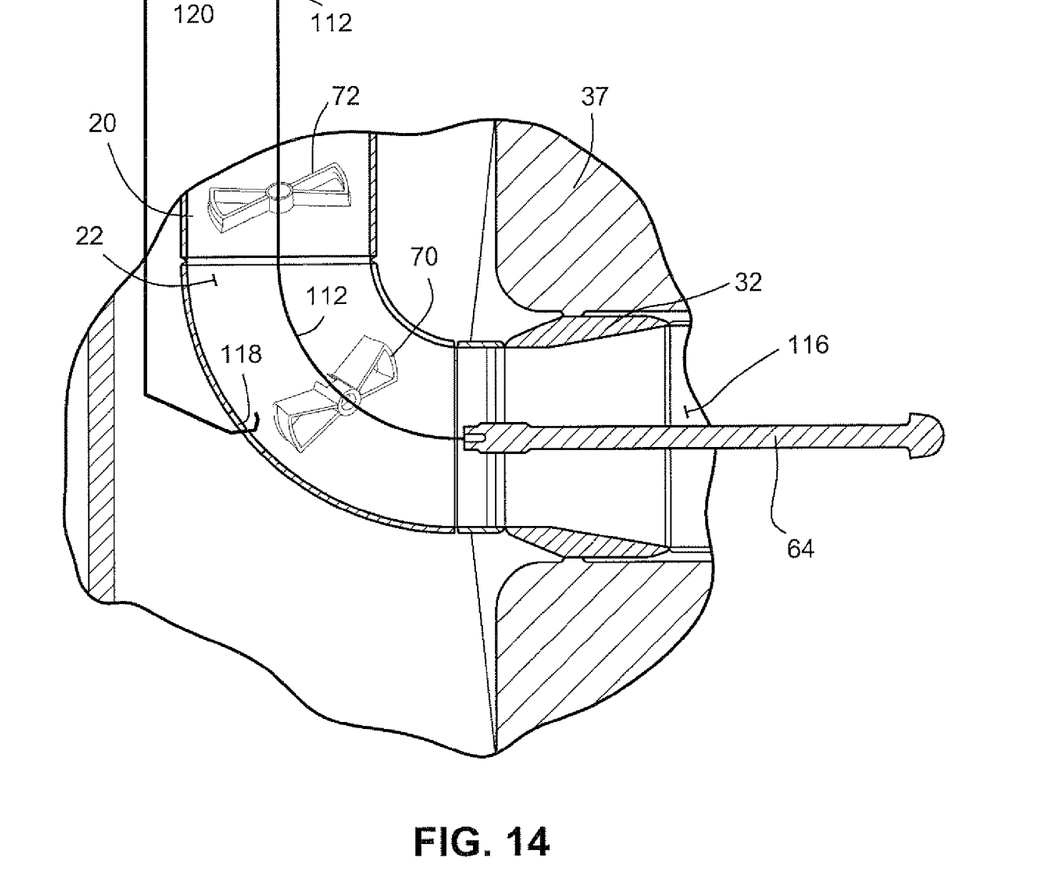
FIGS. 14 and 15 are cross-sectional view of the elbow conduit and thermal sleeve, and show the assembly of the cruciform assembly.

FIG. 14 is a cross sectional view of the riser pipe 20, elbow conduit 22 and thermal sleeve 32, with a cable 112 connecting the unassembled components of the support clamp assembly. The draw bolt 64 and cruciform assembly are assembled inside the jet pump riser pipe 20 and nozzle thermal sleeve 32. A cable 112 is a guide wire to position the components of the cruciform assembly into the thermal sleeve and elbow conduit and slide together the components of the assembly. To provide an opening to the elbow and thermal sleeve, the jet pump inlet mixer assemblies 24 (FIG. 1) are removed to expose two side circular openings 114 (FIG. 1) of the riser pipe transition 28. The cable, bolt and components of the cruciform assembly are inserted through one of the circular openings 114 and down the riser pipe.

At the refuel floor of the core above the jet pump assemblies, the flexible stainless steel cable 112 is attached to the threaded end of the draw bolt 64. The draw bolt is lowered by the cable into one of the circular openings 114 in the riser pipe transition and down the riser pipe. The cable is used to position the draw bolt 64 upstream 116 of the converging conical section of the thermal sleeve segment 32. The cable extends from the bolt, through an opening in the riser pipe transition and has a terminating cable end at the refuel floor of the containment building.

The opening in the base of the primary cruciform 70 is first slid over the terminating end of the cable and then the opening in the base of the secondary cruciform 72 is slid over the end of the cable. The cruciforms slide along the cable into the openings 114 of the transition 28. The cable guides the primary cruciform and subsequently the secondary cruciform through the riser pipe, elbow conduit and upstream of the converging conical section of the thermal sleeve.

The primary cruciform slides along the cable and onto the end of the draw bolt. Subsequently, the cable is used to manipulate the second cruciform to slide on the end of the draw bolt and to slide the base of the secondary cruciform into the slot in the base of the primary cruciform. The bolt and cruciforms are assembled upstream of the converging conical section of the thermal sleeve.

After the bolt and primary and secondary cruciforms have been advanced to upstream 116 of the thermal sleeve, the cable 112 is slackened and lays on the inside surface of the elbow conduit and near an opening 118 in the elbow. A hook 120 is extended from the refuel floor and into the annular space 16 between the shroud and the vessel wall. The hook extends through the opening 118 in the elbow and grasps the cable 112. The free end of the cable is pulled through the riser, out the opening 118, up through the annular space 16 and to the refuel floor. The cable is used to pull the threaded end of the draw bolt 64 out through the opening 120 in the elbow conduit. As the bolt is pulled through the elbow opening, the primary and secondary cruciforms seat on the converging conical section 32 of the thermal sleeve.

Figure 15:
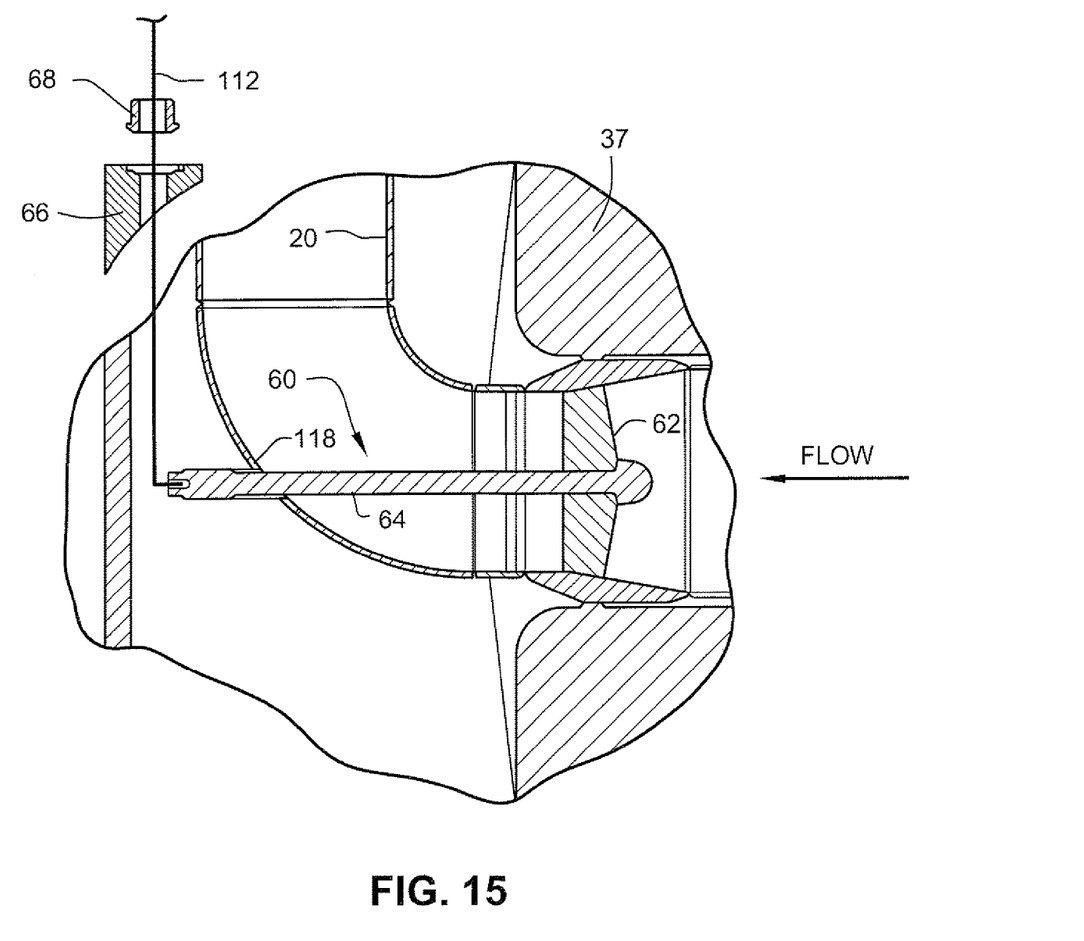

FIG. 15 is a cross sectional view of the riser pipe 20, elbow conduit 22 and thermal sleeve 32, with the cable 112 outside of the riser and guiding the boss 64 and nut 68 to the threaded end of the draw bolt 64. After the hook 120 (FIG. 14) pulls the cable out through the opening 118 in the elbow, the cable pulls the treaded end of the draw bolt through the opening 118 in the elbow. At the refuel floor, the cable is threaded through the elbow boss 66 and nut 68 and they slide down the cable to the end of the bolt. The elbow boss slides over the threaded end of the bolt and seats on an outside surface of the elbow surrounding the opening 118 in the elbow. The nut 68 is guided by the cable to the threaded end of the bolt. The nut is twisted on the threaded end of the draw bolt such that the proper mechanical torque preload is applied to the nut and bolt. Finally, the stainless steel cable 112 is removed from the draw bolt and extracted from the annular space between the vessel wall and core shroud.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to assemble a support clamp assembly in a jet pump of a nuclear reactor vessel, the method comprising:
    attaching a cable to a first end of a shaft and lowering the shaft and cable into an elbow conduit and thermal sleeve of the jet pump;
    guiding at least one thermal sleeve anchor device down the cable to slide the anchor device on the shaft, wherein the anchor device abuts against a second end of the shaft;
    seating the anchor device against an inside surface of the thermal sleeve;
    extending the shaft from the anchor device, through an aperture in the elbow conduit wherein the aperture is in a wall of the elbow conduit;
    attaching a securing device to the first end of the shaft extending through the aperture in the elbow conduit, wherein the securing device abuts an outside surface of the wall of the elbow conduit to apply tension to the shaft, and the tension to the shaft biases the thermal sleeve towards the wall of the elbow conduit.

2. The method of claim 1 further comprising extending the cable through an opening in a riser pipe transition from the jet pump, and inserting the shaft, cable and anchor device through the opening and through an inside of the riser pipe, elbow conduit and thermal sleeve.

3. The method of claim 2 wherein the anchor device includes a primary cruciform and a secondary cruciform, and the method includes sliding the cable through a base in the primary cruciform and then through a base of the secondary cruciform.

4. The method of claim 1 wherein the securing device includes a boss and a nut, and sliding the first end of the shaft through an aperture in the boss and attaching the nut to the first end of the shaft extending through the boss.

* * * * *